H. A. SÉVIGNÉ AND F. K. ARNOLD.
WRAPPING MACHINE.
APPLICATION FILED DEC. 4, 1917.

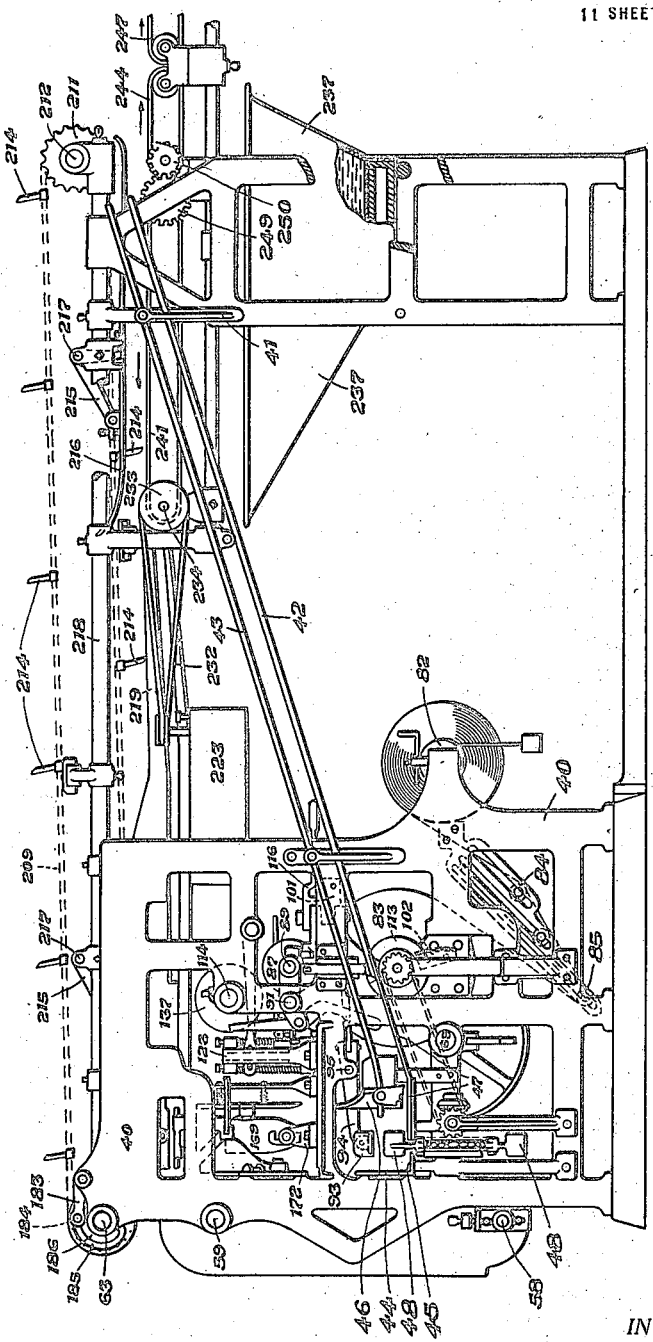

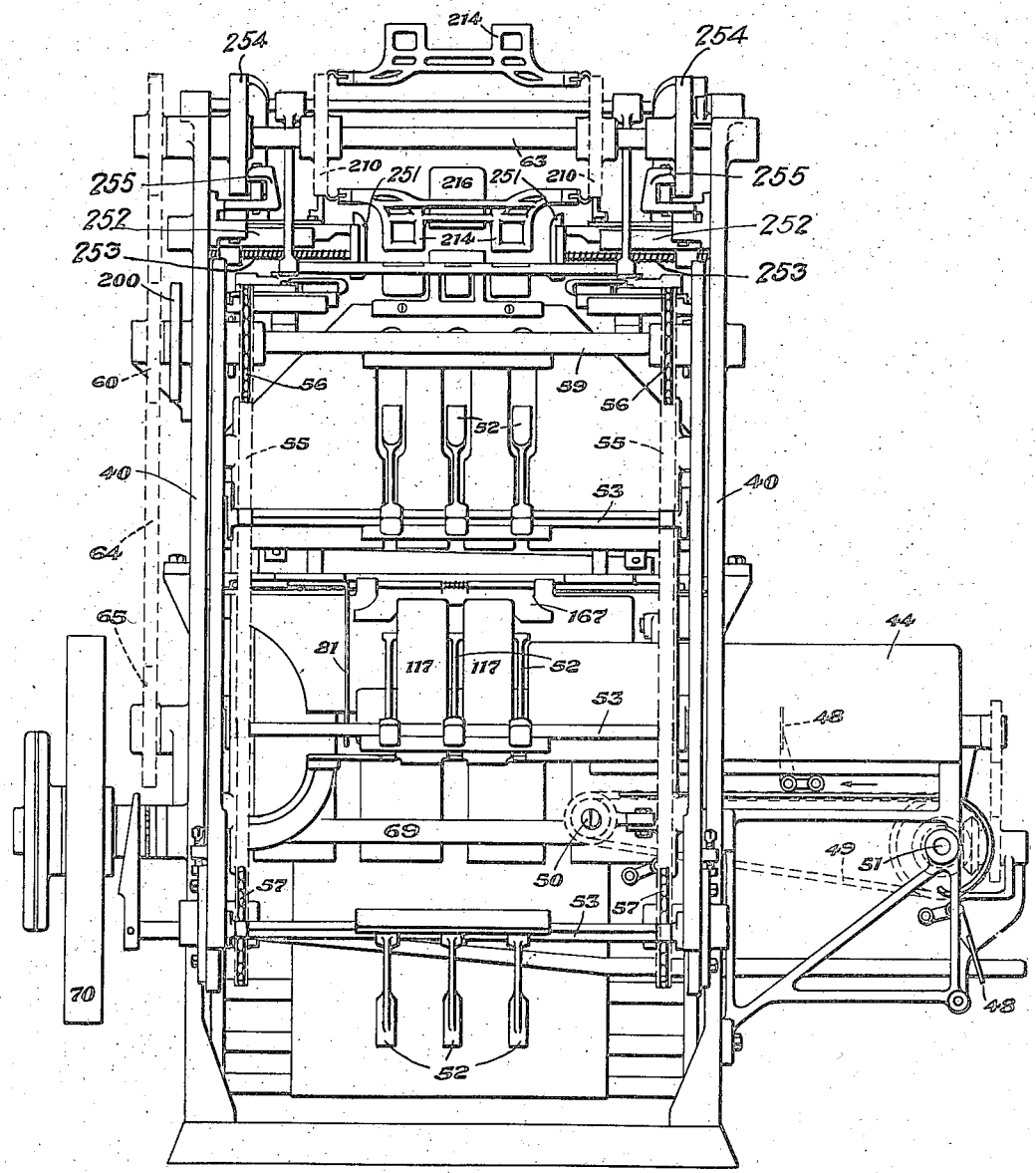

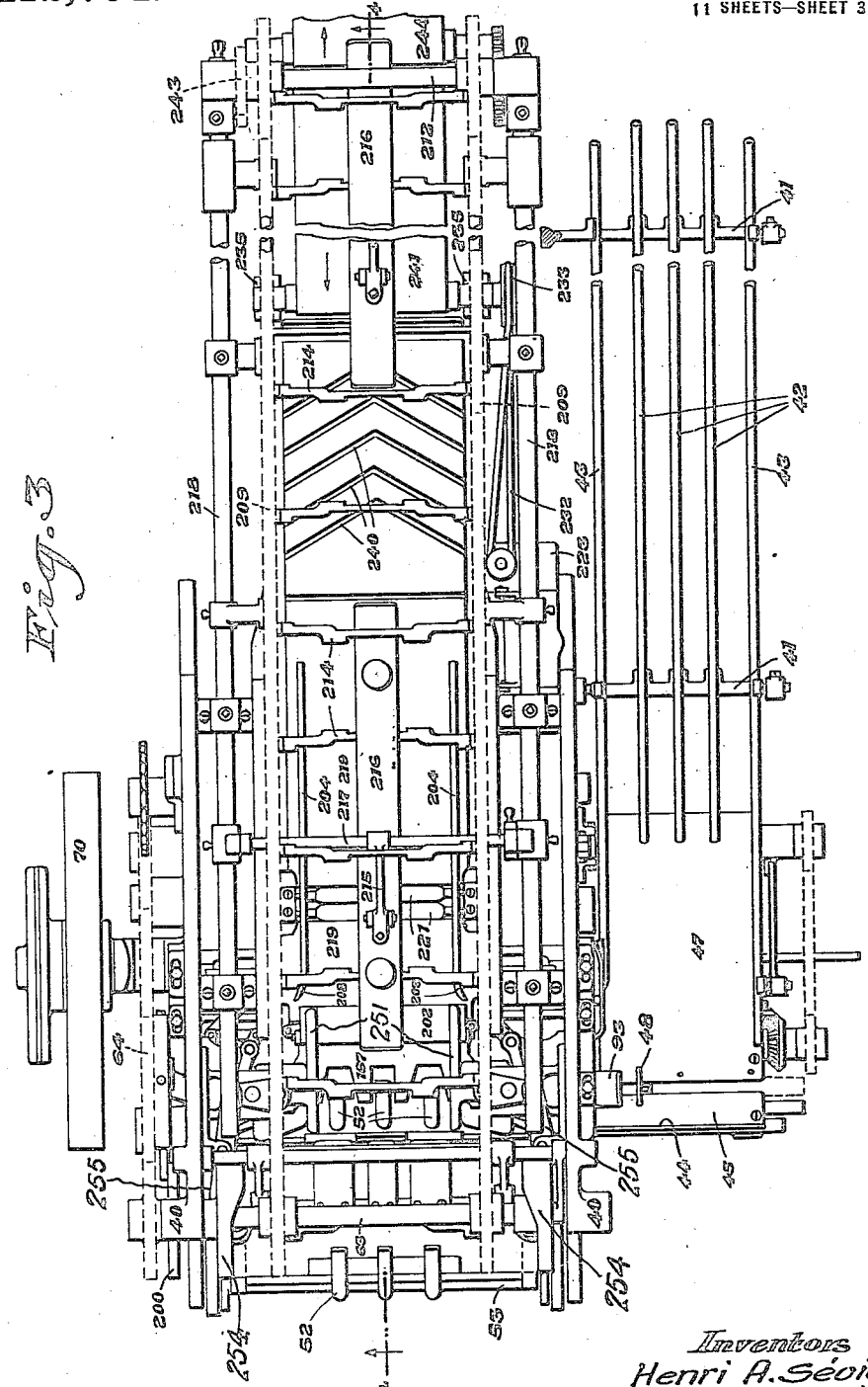

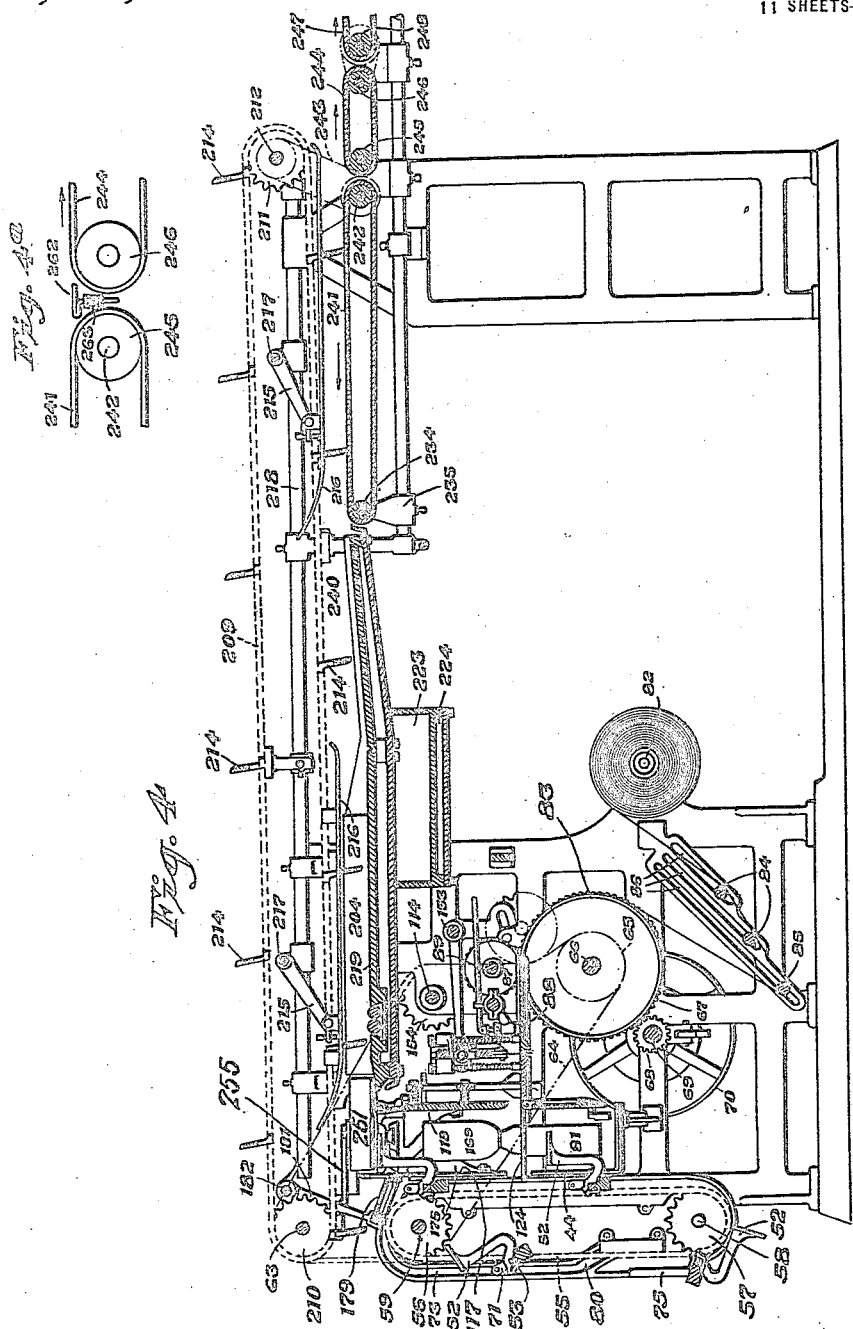

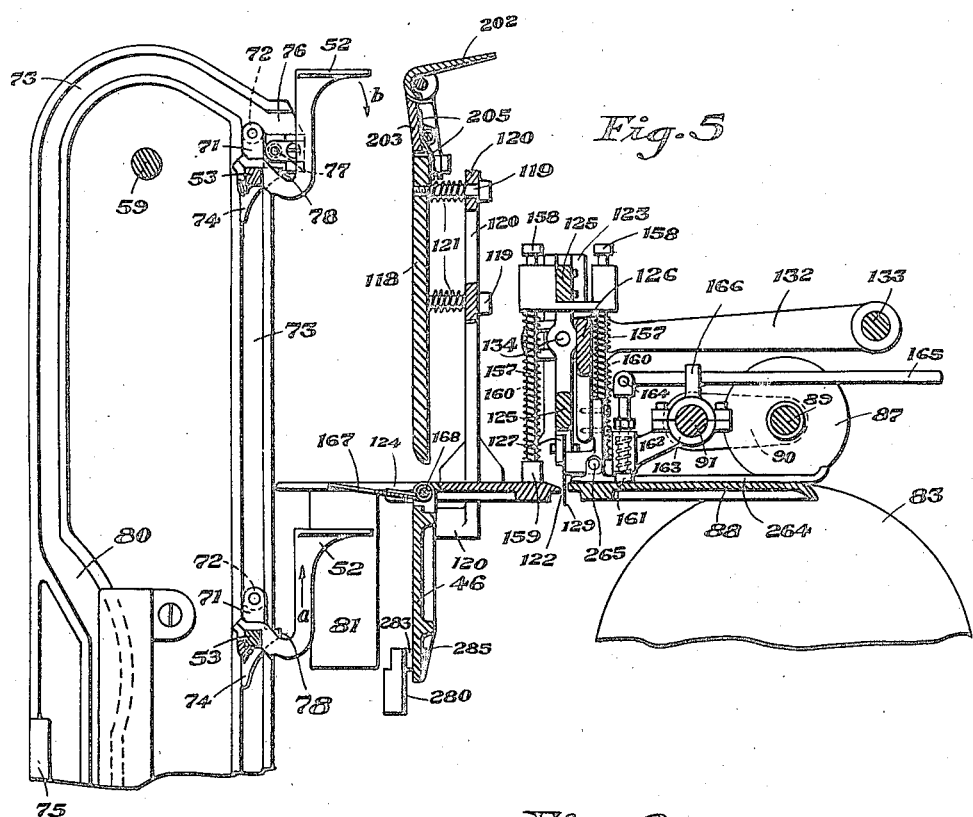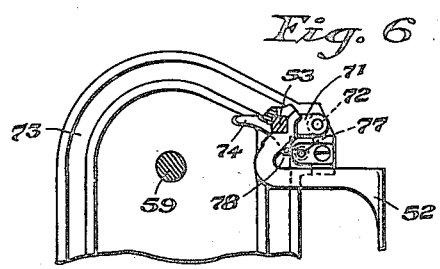

1,412,754.

Patented Apr. 11, 1922.
11 SHEETS—SHEET 6.

Inventors
Henri A. Sévigné
Frank K. Arnold
By
Atty.

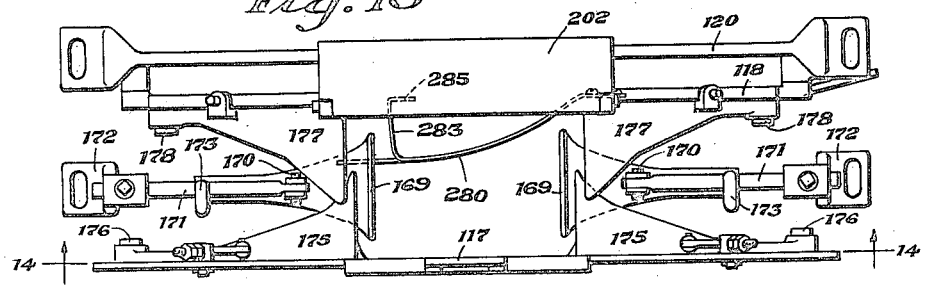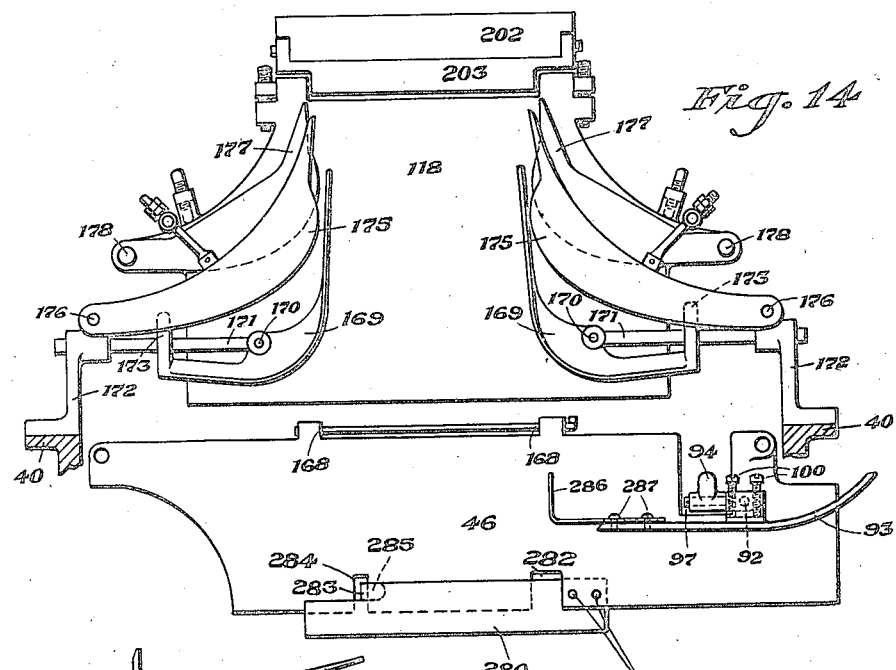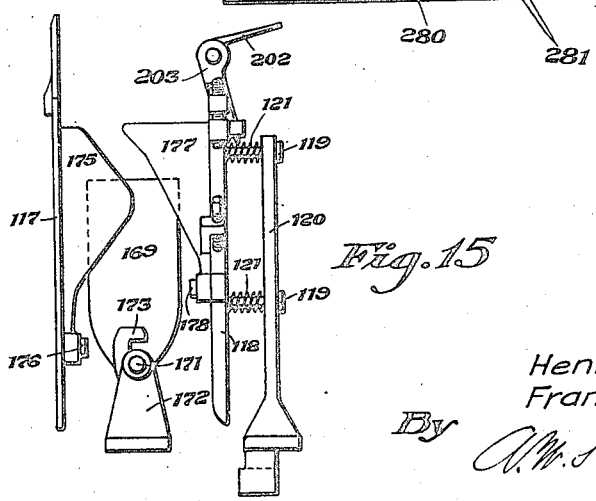

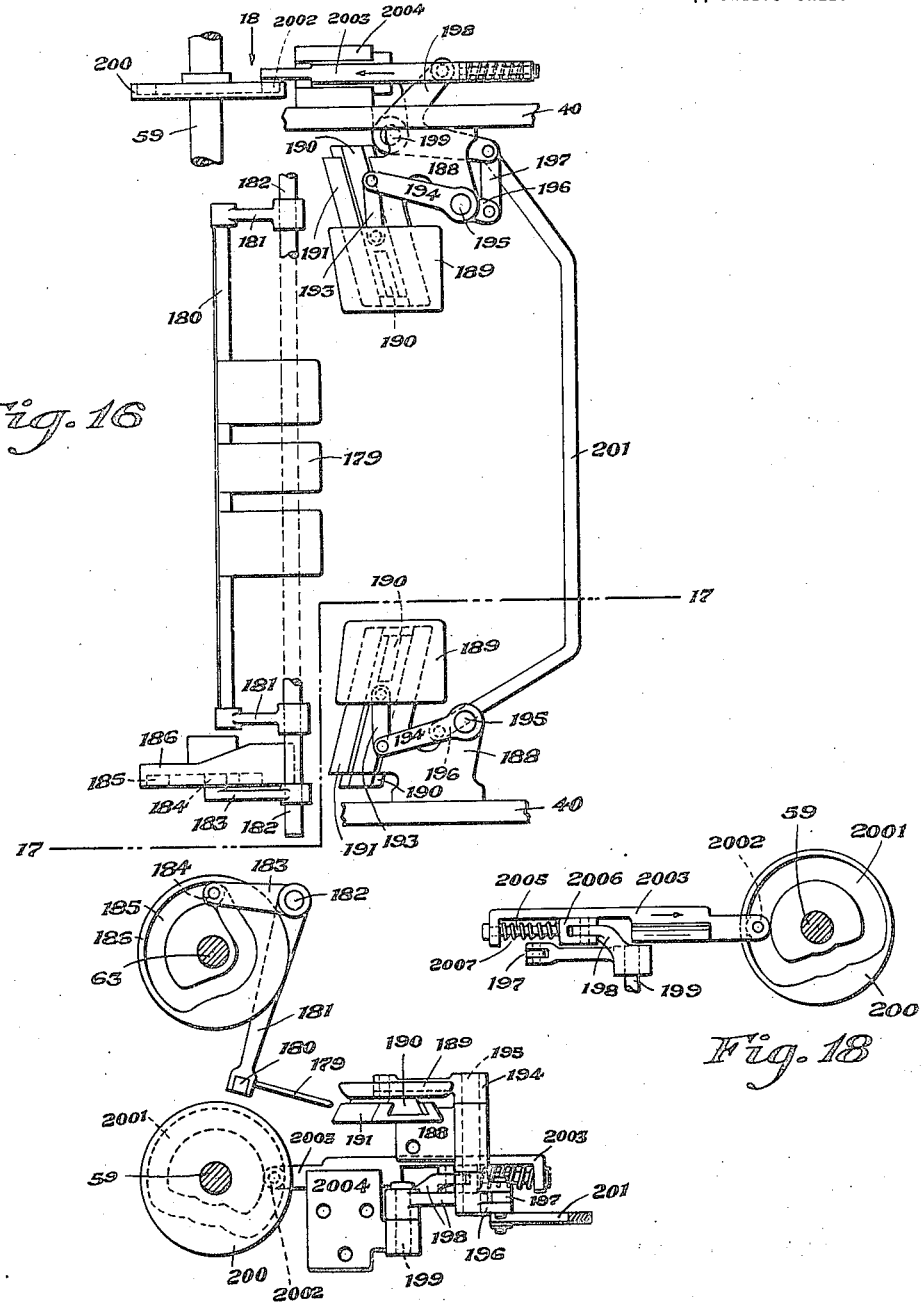

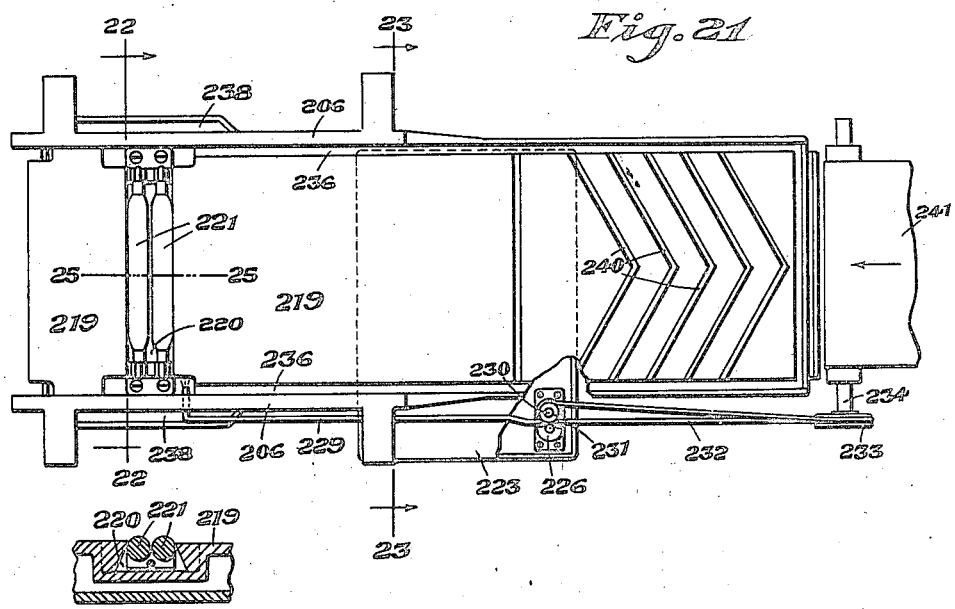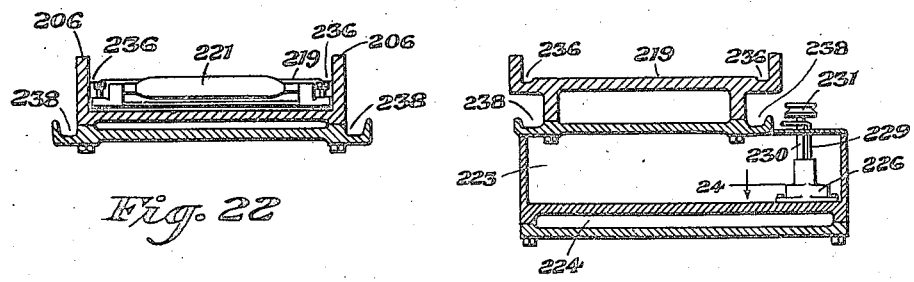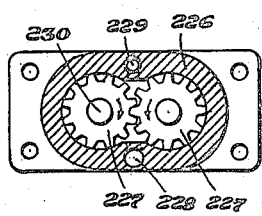

Inventors
Henri A. Sévigné
Frank K. Arnold

UNITED STATES PATENT OFFICE.

HENRI A. SÉVIGNÉ, OF WINTHROP, MASSACHUSETTS, AND FRANK K. ARNOLD, OF NASHUA, NEW HAMPSHIRE, ASSIGNORS TO NATIONAL BREAD WRAPPING MACHINE COMPANY, OF BOSTON, MASSACHUSETTS, A CORPORATION OF MASSACHUSETTS.

WRAPPING MACHINE.

1,412,754.    Specification of Letters Patent.    Patented Apr. 11, 1922.

Application filed December 4, 1917. Serial No. 205,385.

*To all whom it may concern:*

Be it known that we, HENRI A. SÉVIGNÉ and FRANK K. ARNOLD, citizens of the United States, and residents, respectively, of Winthrop, in the county of Suffolk, State of Massachusetts, and of Nashua, in the county of Hillsboro and State of New Hampshire, have invented certain new and useful Improvements in Wrapping Machines, of which the following is a specification.

This invention relates to wrapping machines and has particular reference to machines adapted to wrap articles which vary more or less in shape or size or are quite irregular in form such as loaves of bread.

The present machine is similar in principle and operation to that described and claimed in our Patent No. 1,253,636, dated Jan. 15, 1918, and our present application is, in part, a continuation of the application on which said patent was granted.

One of the objects of the invention is to provide an improved machine of this character which is adapted to use water-proof paper of a character known as "dry waxed" paper, or but slightly waxed, so as to not soil the clothing of a person carrying the wrapped articles. A further object is to provide such a machine adapted to so seal the wrapped article as to render it unnecessary to employ wrapping paper carrying such a quantity of paraffin as to perform the sealing operation.

Another object is to provide a simplified construction of mechanism, for supplying the machine with the article to be wrapped.

A further object is to provide improved mechanism for causing the articles to be lifted through the chute and between the folders.

Another object is to provide means whereby the wrapping material will be delivered uniformly regardless of the gradual reduction of size of the supply roll.

Another object is to provide an improved construction of the feeler mechanism for gaging the size of the wrappers.

Another object is to provide improved primary folders for acting on the wrappers draped over the articles.

Another object is to provide means for preventing rebound of the articles when introduced into the machine against a positioning stop.

Further objects of the invention are to provide improvements in the sealing mechanism and in the folders or tuckers which will be described hereinafter.

With these and other objects in view, our invention consists in the machine and the various parts thereof substantially as hereinafter described and particularly pointed out in the claims.

Of the acompanying drawings which illustrate our improved machine in its present embodiment:

Figure 1 is an elevation, looking from the side which is referred to as the front because of the relative position of the attendant.

Figure 2 is an elevation from the left of Figure 1, on a larger scale.

Figure 3 is a plan view.

Figure 4 represents a longitudinal section on line 4—4 of Figure 3.

Figure 4ª is a detail view hereinafter referred to in connection with the description of the means for ensuring the deposit of the wrapped loaves uniformly on the final delivery carrier.

Figure 5 is an enlarged sectional detail of a portion of Figure 4.

Figure 6 is a view similar to a portion of Figure 5 but illustrating the parts in a different position.

Figure 7:
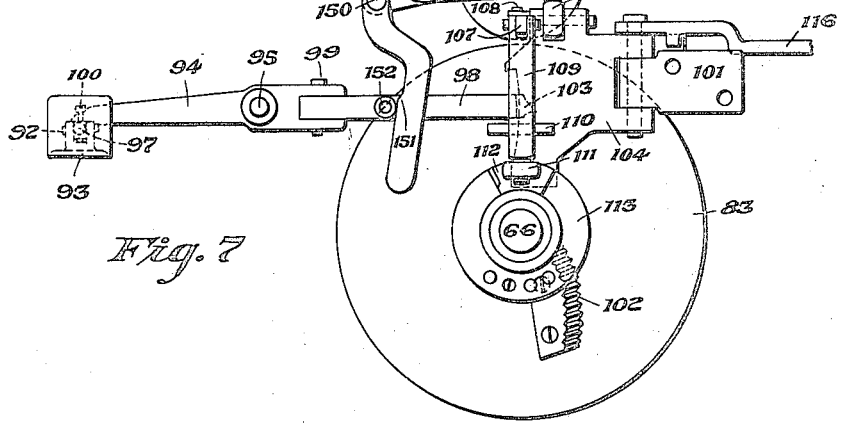

Figure 7 is an enlarged detail view of some of the mechanism illustrated in Figure 1.

Figure 8:
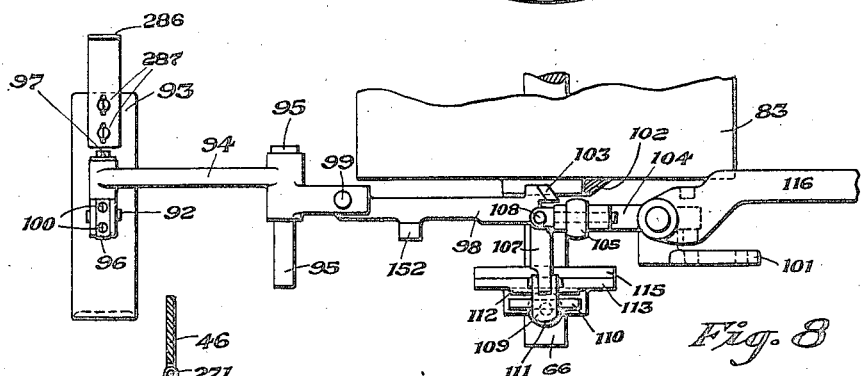

Figure 8 is a plan view of some of the parts shown in Figure 7.

Figure 9:
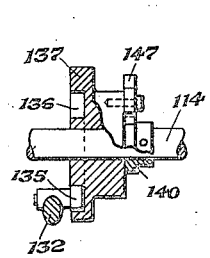

Figure 9 represents a section on line 9—9 of Figure 7.

Figure 10:
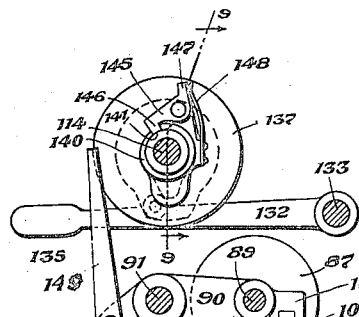

Figure 10 is a detail view from the left of Figure 9.

Figure 11:
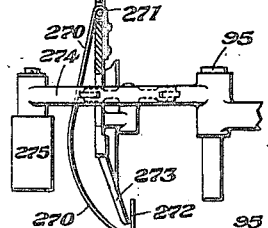

Figure 11 is a view similar to a portion of Figure 8, but illustrating a modification hereinafter described.

Figure 12:
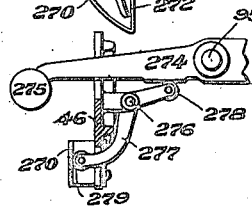

Figure 12 is a side elevation of the parts shown in Figure 11.

Figure 13 is a detail plan view of some of the mechanism below the parts shown at the left of Figure 3.

Figure 14 represents a section on line 14—14 of Figure 13.

Figure 15 is an elevation, looking from the right, of the parts in the upper portion of Figure 14.

Figure 16 is a detail plan view of some of the parts shown at the left of Figure 3 but above the mechanism shown in Figure 13.

Figure 17 represents a section on line 17—17 of Figure 16.

Figure 18 is a detail elevation looking in the direction of the arrow 18 in Figure 16.

Figure 19:
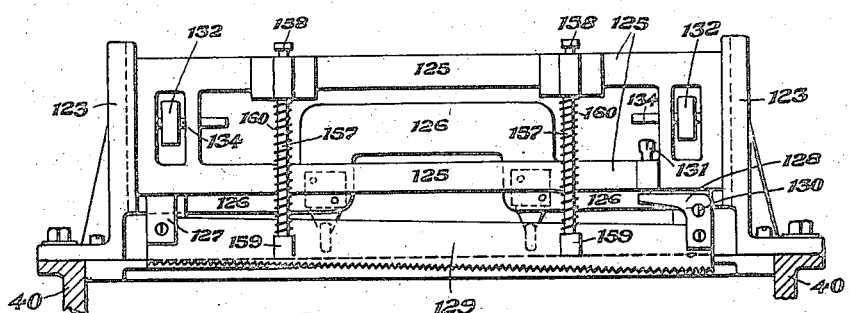

Figure 19 is a detail elevation of part of the web-cutting mechanism.

Figure 20:
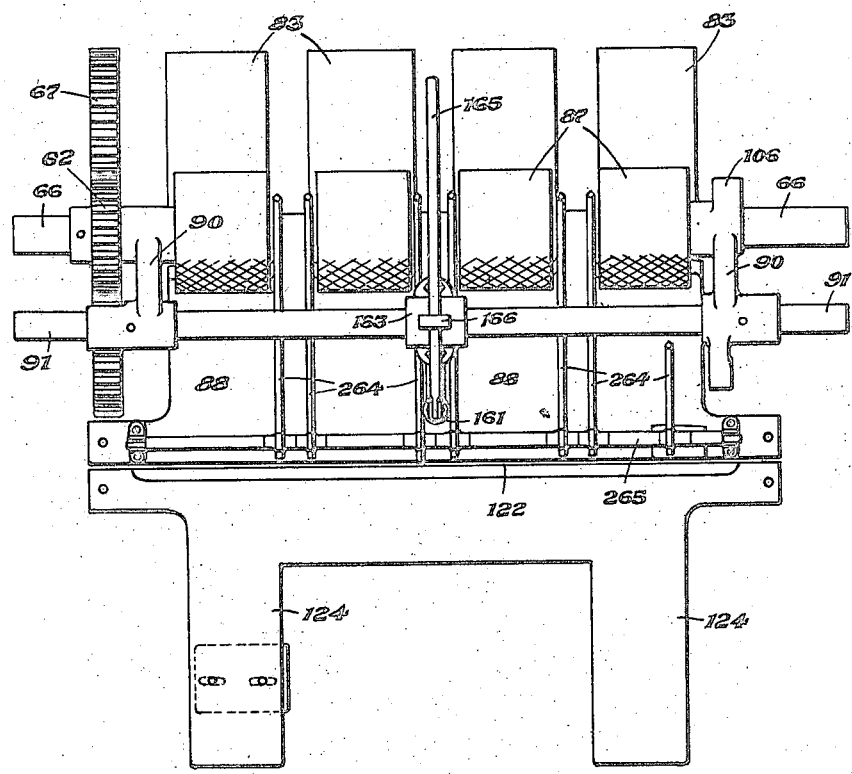
Figure 26:
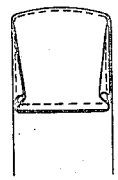

Figure 20 is a top plan view of a part of the web-cutting mechanism.

Figure 21 is a plan view of the heated wrapper-sealing bed.

Figure 22 is a section on line 22—22 of Figure 21.

Figure 23 is a section on line 23—23 of Figure 21.

Figure 24 represents a section on line 24—24 of Figure 23, on a larger scale.

Figure 25 represents a section on line 25—25 of Figure 21.

Figures 26 to 35 inclusive are views to illustrate the progress of the folding operation, the last five figures being side, bottom, end and top views of the completely wrapped loaf.

Similar reference characters indicate similar parts in all the views.

The main frame 40 of the machine comprises two side members and suitable tie-rods or bars. A gravity slideway for the loaves to be wrapped is supported adjacent the front of the machine by brackets 41 and consists of a plurality of rods 42 in one plane, and rods 43 which are longer than and somewhat above the plane of the rods 42, for the ends of the loaves on rods 42 to slide between. The loaves are placed on this slideway and move down in immediate juxtaposition, the front loaf of the advancing row arriving against the upright wall 44 having a foot or base 45. The wall 44 forms one side of a chamber which receives each loaf from the slideway by mechanism hereinafter described, the opposite wall of said chamber being formed by an adjustably mounted plate 46, (Figs. 1, 4, 5, and 14). A longitudinal slot or space is provided between the edge of the foot 45 of wall 44 and the edge of the horizontal plate 47 as shown in Figure 1, for the passage of the pushers 48 which transfer loaves singly from the slideway on to the foot or base 45 and the plate base 47, these two last-mentioned members forming the bed along which each loaf is slid by a pusher to position it for the action of the elevating fingers hereinafter described, and which raise each loaf between the folders which turn in the ends of the wrapper. The pushers 48 ((Figs. 2 and 3) are carried by a chain 49, indicated by dotted lines in said figures, said chain being carried by sprockets mounted on shafts 50, 51. The pushers project upwardly through the slot hereinbefore mentioned. The chain with its pushers is operated continuously in the direction of the arrow in Figure 2, by means of connections with the power shafting of the machine, not necessary to describe herein as it forms no part of our present invention.

The chamber between the wall 44 and plate 46 into which the loaves are delivered by the pushers 48 is slotted, as indicated in Figure 2, to permit the upward passage of the lifting fingers 52, the slots being, of course, also formed in the base portions 45, 47. As shown by comparing Figures 2 and 4, the fingers 52 are arranged in series of three, the three fingers of each series being clamped upon a rod 53 mounted in bearings attached to links of two chains 55, the said chains being mounted on upper and lower sprockets 56, 57. The sprockets 57 are idle and are carried by a shaft 58. The sprockets 56 are connected to rotate with a shaft 59 having a sprocket 60 (dotted lines, Fig. 2.) which is engaged by a chain 64 (dotted lines, Fig. 4) running also over sprockets on shafts 63, 114 and 66, the latter being the shaft of the feeding drum hereinafter described. The shaft 66 also has a gear 67 indicated in Figure 4, said gear meshing with a pinion 68 on the main driving shaft 69, said shaft having a pulley 70 for a driving belt.

As hereinafter described, each loaf, as it is lifted by the fingers 52 between the front and rear walls of the chute or vertical passageway, is brought into juxtaposition with an overlying section of wrapping material such as paper, and the wrapper is folded all but the bottom edges or flaps. It is essential that the fingers, after they have brought each loaf to the upper end of the chute or vertical passageway, shall be interrupted in their elevating movement to permit the tucker 179 to operate as hereinafter described. To effect this result each finger-carrying shaft 53 has secured to one or both ends thereof, preferably one at each end, an arm 71. Each arm 71 has a roll 72 (Figs. 5 and 6) traveling in a cam track 73. Each arm 71 also has a toe 74 adapted to engage the upper end of a rib 75 (Fig. 4) for a purpose presently described. As best shown in Figure 5, the cam track 73 is offset at 76, and below the offset is a stationary pin or roll 77 in the path of a toe 78 of arm 71. As each rod 53 rises in the direction of the arrow $a$ in Figure 5, the toes 78 contact with the two rolls 77 and continued movement causes the rolls 72 to swing into the offsets 76 so that said offsets act upon the arms 71 to quickly swing the fingers 52 downwardly in the direction of the arrow $b$ in Figure 5, resulting in a slight dropping of the support for the loaf. As the rod 53 continues to move, the roll 72 at each end rides along the cam track as indicated in Figure 4 until the inclined portions 80 of the cam tracks are reached, when the toes 74, by contacting with the upper ends of the ribs 75, cause the rolls 72 to swerve into the inclined tracks 80, resulting in throwing the fingers over as indicated as the lower left-hand portion of Figure 4, ready to lift the next loaf. The complete turning over of the rod carrying the fingers avoids any liability of the fingers remaining in an intermediate position. After each rod carrying the fingers passes the inclined portions 80, the rolls 72 pass into and follow along portions of the cam track which ensures the fingers occupying the position shown at the right in Figure 4.

The stop ribs 75 are emergency devices. Usually gravity will cause the fingers to swing the rolls 72 into the inclined portions 80 of the tracks 73, but if such swinging movement is delayed, contact of toes 74 with the ribs 75 positively starts the required swinging movement.

Each loaf brought to position by a pusher 48 is stopped by a plate 81 (Figs. 2 and 4), it being understood, of course, that each pusher after it advances a loaf against the plate 81 passes downwardly over the axis of the shaft 50.

The paper from which wrapper sections are severed is inserted horizontally across the vertical chute or passageway above each loaf, so as to be draped over the loaf as it is carried upwardly by fingers 52. It is fed from a roll on a suitably mounted core 82, the paper then passing under two or three gravity rolls 84, 85 (Figs. 1 and 4) on its way to the feed drum 83, said rolls serving to automatically reduce the pulling tension on the roll or core 82 as the diameter of said roll decreases. The operation of the feeding mechanism is intermittent, as hereinafter described. The gravity rolls are guided at their ends in inclined ways 86, and are removable so that rolls of different weight may be substituted one for another. The object of the gravity rolls is to compensate for the gradually reducing size and inertia of the roll of paper on the core 82. When a large roll of paper is in place, it requires more weight to draw off the loop of paper between the roll and the drum 83 than when the roll is small. When the feeding mechanism acts and takes up some of the loop of paper, if the roll 85 is insufficient to exert an unwinding pull upon the web, the loop continues to be taken up until the next roll 84 is also lifted from its lower position, suitable stops being employed to normally limit the lower position of rolls 84 to a higher plane than the lowermost portion of the roll 85. When the roll of paper has been considerably reduced in diameter, its inertia becomes less and the combined weight of the rolls 84, 85 might then be too great to prevent the feeding action from causing a jerk upon the supply roll. The lower roll 85 alone, however, has not sufficient weight to prevent being lifted up the inclines when the feed commences to act, and therefore the pull upon the supply roll is an easy and comparatively steady one.

The mechanism just described, by automatically reducing the tension on the paper as the diameter of the supply roll is reduced, facilitates continuous proper operation of the machine as a whole because it ensures the delivery of smooth and untorn sections of paper to be assembled with the loaves of bread.

The web tension mechanism just described is not claimed herein but forms the subject matter of our divisional application filed November 17, 1921, Serial No. 515,764.

The paper passes over the drum 83 and under a vertically movable series of rolls 87 (Figs. 4, 5 and 20) and then over a bed 88. The rolls 87 are mounted upon and so as to rotate with a shaft 89. The drum 83 is preferably composed of several sections in alinement, as shown in Figure 20, a roll 87 bearing on each section. The shaft 89 is mounted at its ends in arms 90 of a rockshaft 91, means being provided, as presently explained, for rocking said shaft 91 so that when the rolls 87 bear upon the paper, the web will be advanced to the severing mechanism.

A pinion 62 of shaft 89 meshes with the gear 67 carried by the shaft 66 of the drum.

In order that the length of each wrapper section severed from the web shall accord with the particular loaf which is to be wrapped in that section, I provide the following mechanism: A feeler 93 is located in the path of movement of the upper portion of a loaf that is being carried by one of the pushers 48 into the path of the fingers 52. The front end of this feeler 93 is curved upwardly, as indicated in Figure 14. Said feeler is pivoted at one end of the lever 94 mounted to rock on a pivot pin 95 suitably supported by the frame of the machine as indicated in Figure 1. The axis 97 of said pivotal connection with said lever is parallel with the path of movement of the loaf that is passing under the feeler so that if the top of the loaf is irregular, the feeler can rock so as not to bear only upon the highest portion of the loaf, which highest portion is liable to be quite small and would be crushed down if the feeler were to be rigid with its carrying lever.

The feeler has ears rising from its upper side (Figs. 7 and 8) said ears embracing, and being pivotally connected at 92 to, a block 96 having a pin 97 extending into a loose bearing at the end of lever 94. While the feeler is always free to tilt or rock sideways, on pivot 97, for the reason just described, the connection described permits it to be adjusted on pivot 92 by means of two screws 100 which pass through block 96 on opposite sides of pivot 92 and bear on the upper surface of the feeler between the ears.

By loosening one screw and turning in the other, the feeler can be set more or less slanting so that it will be lifted higher by a passing loaf and increase the length of paper drawn off for wrapping, by the mechanism presently described.

An arm 98 is connected to the lever 94 by a vertical pivot 99, and practically constitutes with the lever 94, a jointed lever, the fulcrum being at 95. By mechanism presently explained, the amount of tilting movement imparted to the jointed lever 94, 98, by a loaf passing under feeler 93, controls the length of the wrapper section that is severed from the web and placed in position to be wrapped around the particular loaf which acted upon said feeler. The means for acting on the member 98 comprises a toothed rib 102 carried by the drum 83 the surface of said rib which is toothed being cam-shaped, as indicated in Figure 8. The end of the member 98 of the lever has a tooth 103 which is pointed, as shown in Figure 7, and cam-faced on one side, as shown in Figure 8. As has been stated, the drum 83 revolves continuously, and of course the rib 102 moves with it. If no loaf passes under the feeler 93 the tooth 103 will remain in a position somewhat higher than shown in Figure 7, the end of rib 102 simply passing under the tooth. When a loaf, however, acts upon the feeler 93 to raise it, the tooth 103 is lowered more or less according to the height or vertical thickness of the loaf. The rib 102 is so positioned, and so curved in the direction of its length, that the larger the loaf to be wrapped, and consequently the lower the position to which the tooth 103 is shifted, the longer will be the coaction between the feeding drums and the movable rolls 37, as will be presently described.

A bracket 101 (Fig. 7) secured to the frame of the machine as indicated in Figure 1, has a plate 104 connected to it by a vertical pintle, said plate carrying a roll 105 engaging the under side of a lug 106 of one of the arms 90 of rockshaft 91. A link 107 is pivotally connected at one end 108 to the plate 104 and at the other end is pivotally connected to the upper end of a lever 109 pivotally supported at 110. The frame support for pivot 110 is omitted from Figs. 7 and 8 to avoid confusion. The lower end of lever 109 carries a roll 111 adapted to be acted upon by a cam 112 carried by a disk 113 surrounding shaft 66 and adjustably connected to a disk 115 which is secured to said shaft. The adjustable connection is illustrated in Fig. 7 as consisting of a screw which made fast through either one of a series of holes in disk 113, into disk 115. A hand lever 116 is mounted on the pintle of plate 104 and has a pair of spaced lugs adapted to engage one side or the other of a tongue projecting from said plate, to enable said plate to be swung by hand, when desired.

When the rib 102 has passed around from the position shown in Figure 7 and the toothed face thereof engages said tooth 103, the inclined or beveled formation of the rib 102 acts upon the laterally inclined or beveled face of the tooth 103 which overlaps the hinged plate 104, the member 98 swinging laterally upon its pivot 99, and the overlapping tooth 103 engaging the edge of plate 104 and swinging the latter out to remove its roll 105 from under lug 106 of arm 90, thus permitting feed rolls 87 to drop toward drum 83 and feed the paper. Of course the quicker the drop of the upper feed rolls 87, and the longer the contact remains, the longer will be the extent of advance of the web, so as to increase the length of paper passed over the loaf which has acted upon the feeler 93.

This is effected by the toothed rib 102, the longitudinal configuration of which, and its mounting on drum 83, being such that when feeler 93 is raised by a large loaf, and tooth 103 is consequently lowered to be acted upon by a portion of the rib near its inner end, the removal of roll 105 from under lug 106 will occur at an earlier point of the revolution of drum 83 and said toothed rib than when a smaller loaf is passing and the tooth 103 is acted upon by a portion of the rib near its outer end.

The feed of paper continues until cam 112 acts on roll 111 to oscillate lever 109 which acts through link 107 to thrust plate 104 back and cause its roll 105 to act on lug 106 to lift the upper feed rolls. The adjustable connection of disk 113 which carries cam 112 to disk 115, enables the amount of paper to be varied for the wrappers. Such adjustment will, of course, cause all wrapper sections to be longer, or shorter, as desired. When it is desired to temporarily vary the length of wrapper sections, such variations can be more quickly effected by tilting the feeler 93 endwise, as hereinbefore described, than by shifting disk 113. As above described, the removal of roll 105 which is carried by plate 104, from position supporting the lug 106, results in the paper being fed. Consequently anything which effects such removal will result in the paper being fed. Consequently, by means of the handle 116, the attendant may swing the plate 104 to cause paper to be fed through the machine without being under the control of the loaf, because such swinging shifts the roll 105 away from the lug 106.

As indicated in Figures 4 and 5, the vertical passageway or chute has two walls of which the wall 117 may be rigid, said wall being, of course, vertically slotted (see Fig. 2) for the passage of fingers 52. The other wall 118 is yieldingly supported, as by means of screws or pins 119 passing through a bracket 120, springs 121 being located between said bracket and wall.

A table or bed 88 is transversely slotted as at 122 (Figs. 5 and 20), and has extensions 124 to support the end of the web that is fed forward past the knife, presently described, it being understood that the loaf carried by the lifting fingers 52 passes upwardly through the rectangular space between the extensions 124. These extensions of the bed occupy a horizontal position so as to momentarily support the section of paper that is cut off, under the control of the loaf that is just then being brought to position, so that the fingers 52 will lift that loaf and carry it upwardly through the vertical passageway or chute with the wrapper section draped over the loaf.

Rising from the frame of the machine at the opposite ends of the slot 122 are brackets 123 (Fig. 19), said brackets being connected by a cross bar 126. Mounted to slide in vertical ways provided by the brackets 123 is a casting 125. A lug 127 depending from the casting 125 supports one end of a knife 129, the other end being supported by a tightener 128 pivoted at 130 and adjusted by a screw 131. The lower edge of the knife is preferably serrated, as shown in Figure 19, and said edge coacts with one edge of the slot 122 in shearing the web of paper.

To prevent the front edge of the web from catching upon the farther side of the slot 122 when said web is advanced, the surface onto which said edge passes is bevelled.

The casting 125 carrying the knife is vertically reciprocated by means of two arms 132 of a rockshaft 133 (Figs. 5 and 7), the ends of the arms 132 engaging pins 134 (Figure 19) of the casting. One of the arms 132 has a pin provided with a roll 135 (Figs. 7, 9 and 10) which enters a cam groove 136 in a disk 137 loosely mounted on shaft 114 alongside of a collar 140 which is secured to the shaft, the collar 140 having a peripheral notch 141 (Fig. 7). An arm 145, pivoted to disk 137, has a tooth 146 to engage notch 141, of collar 140 and has a detent lug 147, a spring 148 normally holding it as shown in Figure 7, with the tooth 146 bearing on the surface of collar 140.

The object of the construction just described is to avoid useless reciprocations of the knife when there is no feed movement of the web and, as described, there is no feed of the web when there is no loaf approaching and acting upon the feeler 93. Cooperating with the detent 147 is a stop lever 149 pivotally supported at 150, conveniently to an extension of an arm 90, the lower end of said lever having a cam surface 151. A pin or roll 152 projecting laterally from the member 98 of the jointed lever, acts upon the cam 151 of the lever 149 when said member 98 moves downwardly, due to the passage of a loaf under the feeler 93. This oscillates the lever 149 to remove it from the path of motion of the detent 147. To explain this operation, it should be mentioned here that in Figure 7 the detent 147 is not shown in its normal position of rest but as approaching that position. When the detent 147 contacts with the end of stop lever 149, the arm 145 is oscillated so as to swing the tooth 146 out of the notch 141 of actuating collar 140, thus unlocking disk 137 from shaft 114 so that the cam groove of said disk will not act on roll 135 of arm 132 to actuate the knife. It being understood that the shaft 114, to which the collar 140 is secured, is constantly rotated, it will be apparent, of course, that when the arm 145 and its tooth 146 occupy the position shown in Figure 7, the shaft 114, through said secured collar 140 and the arm 145, will rotate the cam disk 137, and consequently causes the knife bar to descend and rise again. This is due to the interengagement of the tooth 146 with the notch 141, this engagement being broken, however, as soon as the detent 147 contacts with the upper end of the stop lever 149. When a passing loaf lifts feeler 93 and causes roll 152 to pass below cam 151 and swing lever 149, as shown in Figure 7, the upper end of said lever is thereby swung out of the path of detent or arm 147, and the spring 148 acts to cause reengagement of the tooth 146 and notch 141.

The shaft 114 is provided with a sprocket 154 (Fig. 4) whereby said shaft is driven by the chain 64.

We will now describe the pressers which hold the paper upon the bed 88, referring particularly to Figures 5 and 19. Mounted to slide vertically in ears of the casting 125 are four rods 157, two each side of the knife. The upper ends of the rods have stop nuts 158, and their lower ends have pads or feet 159. Springs 160 coiled upon the rods 157 between enlargements at the lower ends thereof and the ears of the casting, cause the feet to bear yieldingly upon the paper when the casting descends, the said rods and the feet being lifted, of course when the casting rises, by contact of the ears of the casting with the stop nuts 158. When the knife descends, the four presserfeet 159 serve to hold not only the rear portion of the section which is cut off but also the front portion of the remaining web so as to avoid any shifting of either the cut-off section or the web due to the action of the descending knife.

An auxiliary presser-foot 161 (Figs. 5 and 20) is employed to hold the web when the knife and the pressers carried thereby are raised, and when no feed is taking place. At such time, and of course with the upper feed rolls 87 raised, the weight of the gravity rods 84, 85, or either of them, in the loop of paper would be liable to draw the web backwardly. Therefore said presser-foot 161 is caused to bear upon the paper when the feed rolls 87 are raised. Said presser-foot 161 is carried by the lower end of a spring-pressed plunger carried by an arm 162 forming part of a clamp 163 secured to rockshaft 91 in such manner that when the rockshaft 91 is actuated as hereinbefore described and occupies the position with its arm 90 as shown by Figure 7, the presser-foot 161 is lowered; but when the upper feed rolls 87 are lowered, the consequent movement of the rockshaft lifts the presser-foot 161 from the paper to permit the feed thereof. As indicated in Figure 20, the presser-foot 161 occupies a substantially central position transversely of the machine, to bear upon the middle portion of the web. Therefore, when the presser-foot 161 is bearing upon the paper, if it has become twisted or askew or tends to assume such position, the gravity tension roll or rolls 84, 85 will straighten the paper out. The liability of the web not being located straight in the machine is greater when the web is being first introduced by the attendant. In order that the said presser-foot 161 may be temporarily lifted manually, the stem of the plunger which carries said foot extends up through the socket of the arm 162 and is pivotally connected at 164 to a hand lever 165 having a fulcrum in an ear 165 of the upper member of the clamp 163. When the machine is being first supplied with paper or being "threaded up", the attendant, by means of the hand lever 165, lifts the auxiliary central presser-foot 161 and pushes the end of the web through and under the knife and then releases the hand lever. If then the paper is somewhat askew, a backward reeling-up motion of the supply roll will lift one or both of the gravity tension rods if they are already in contact with their lower stops, and cause said rods to coact with the centrally located presser-foot 161 to straighten the paper.

We will now describe the means for folding the wrapper about the loaf, it being understood that a section of the material has been cut off and is resting upon the extensions of the bed 88 in position to be draped over the loaf that is being elevated by fingers 52. As shown in Figures 2 and 5, a plate 167 is hingedly supported at 168, said plate being in position to extend between the top of the rising loaf and the wrapper section. As the loaf rises, it swings the plate 167 upwardly so as to smooth out the flap of the wrapper that is being drawn inwardly below the wall 118 as the loaf rises. The primary end folders 169 (see Figs. 13, 14 and 15 in connection with Fig. 4) extend upwardly along opposite ends of the vertical passageway or chute, and are pivoted at 170 to rods 171 adjustably supported by brackets 172 carried by the frame of the machine. The upright portion of each folder 169 is flexible and a lower arm thereof is formed or provided with a hook 173 extending over rod 171 to limit the rocking movement of the folder in an outward direction. The weight of folders 169 causes them to bear yieldingly against the rising loaves. These folders 169 act upon the wrapper as it and the loaf rises, to fold the wrapper to the position shown in Figure 26.

Figure 27:
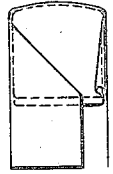

Secondary folders 175 pivotally supported at 176 are laterally shaped as shown in Figure 15 so that said folders will act upon portions of the wrapper to fold those portions to the position indicated in Figure 27.

Figure 28:

A third pair of folders 177, pivotally supported at 178 have their inner ends laterally shaped as shown in Figure 15 to next fold the wrapper to the form shown in Figure 28.

All the folders 169, 175 and 177 are so mounted that their acting portions move or yield relatively to the ends of the loaf so as to compensate for irregularity in formations, such as overhanging upper portions of a loaf, the tips of the folders being above the pivotal points so that if a loaf having an enlarged top is being elevated between the folders, the end folds of the wrapper will be carried inwardly singly against the portions of the loaf which were accurately shaped by the baking pans.

Figure 29:
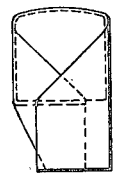

After the wrapper has been acted upon by the third pair of folders 177, a side flap tucker 179 (Figs. 4, 16 and 17) folds the wrapper to the position shown in Figure 29. The tucker 179 comprises a plate which may be slotted as shown in Figure 16, said plate being carried by a rod 180 secured to the lower ends of the two arms 181 of a rock shaft 182 mounted in suitable bearings, and having a third arm 183 carrying a roll 184 engaging a cam groove 185 in a disk 186 secured to the shaft 63.

The timing of the operation of the parts is such that the interruption of the lifting movement of the fingers 52 occurs just before the tucker 179 (Figs. 16 and 17) operates to fold the rear depending flap of the wrapper under the loaf as shown in Figure 29. Since this interruption of the lift is effected by a slight dropping movement of the fingers, it is desirable that the loaf shall be temporarily held at the top of the chute while said tucker operates and in position for one of the pushers 214 to then slide the loaf away in a horizontal direction. The means for so holding the loaf by temporarily and yieldingly gripping its ends comprise two plates 251 (Figs. 2, 3 and 4) mounted to slide in suitable ways 252 and normally actuated toward each other by springs 253. Said plates are spread apart at suitable times to admit between them a loaf which is lifted as described, by cams 254 carried by the shaft 63, said cams acting upon levers 255 which are pivoted to the frame and connected to the slides of the plates 251.

Figure 30:
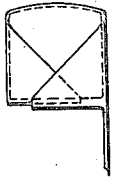
Figure 35:
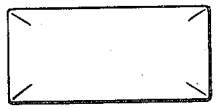
Figure 33:
Figure 31:
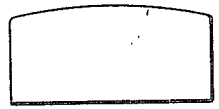
Figure 34:
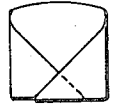

Instantly following the operation of the tucker 179, there are two end tuckers 189 which fold the wrapper to the form shown in Figure 30. The end tuckers reciprocate toward and from each other. Each tucker plate 189 is mounted upon a block 190 (Figs. 16 and 17) mounted in a laterally inclined slideway in an extension 191 of bracket 188. Each block 190 has a pin 192 which is connected by a link 193 with an arm 194 of a rock-shaft 195 mounted in a vertical bearing of bracket 188. Each rock-shaft has another arm 196, but the arm 196 of one rockshaft projects in one direction, while the arm 196 of the other rockshaft projects in another direction, as shown in Figure 16. One of the arms 196 is connected by a link 197 with an elbow lever 198 pivoted at 199 and actuated as presently described. A link 201 connects the pivotal point where lever 198 is connected to link 197, with the arm 196 of the rock-shaft at the other side of the machine, so that actuation of the elbow lever 198 will cause the end tuckers 189 to simultaneously approach each other and simultaneously return outwardly.

Actuation of lever 198 is effected by a disk 200 (Figs. 16, 17 and 18) carried by shaft 59 and having a cam groove 2001 with which is engaged a roll 2002 at the end of a slide 2003 mounted in a fixed slideway 2004. A short rod 2005 passes through an aperture in the bent outer end of slide 2003 and has a yoke 2006 pivotally connected to elbow lever 198. A spring 2007 between the yoke 2006 and the bent end of the slide acts to take the thrust when cam groove 2001 forces the slide 2003 in the direction of the arrows thereon in Figs. 16 and 18 and yieldingly transmit said thrust to the end tuckers 189 through the lever and link connections previously described.

The folding of the last or bottom flaps so as to give the wrapper the form shown in Figures 31 to 35 inclusive, by the removal of the loaf over the top of the wall 118 toward the sealing mechanism, results in the last or bottom flap being folded underneath. Carried by the upper end of the yieldingly mounted wall 118 (Figs. 5, 13, 14 and 15) is a plate 202 so mounted that when a loaf is pushed upwardly, said plate 202 yields, but moves back under the edge of the wrapped loaf just before the elevating fingers 52 drop away from the bottom of the loaf as hereinbefore described.

Said plate forms practically a swinging extension at the top of one wall of the chute and acts as a detent or temporary support to prevent any liability of a loaf dropping when the supporting and carrying fingers 52 leave it. That is, said plate 202 prevents the lower front corner of the loaf from dropping. When a lifter elevates a loaf to the top of the chute the plate 202 moves to let the loaf pass it and then moves back slightly under the loaf. At substantially the same time the plates 251 grasp the ends of the loaf and the tucker 179 moves under the lower rear corner of the loaf so that said loaf, although no longer supported by a lifter, is held temporarily in exact position to be removed by a horizontally travelling pusher 214 without risk of damaging the loaf or tearing its wrapper.

The plate 202 is pivotally mounted in ears of a bar 203 which, in turn, is pivotally mounted in ears of the wall 118 as shown by comparing Figs. 5 and 14. Springs 205 coiled around the pivots of bar 203 act to normally hold the bar 203 and plate 202 in the position shown in Figure 5 but so as to yield as just described.

Immediately after the fingers 52 have so left the loaf, after it reaches the plane above plate 202, said loaf is moved along over the sealing mechanism. Before describing said sealing mechanism, however, we will explain that the folded ends of the wrapper are held in, as the loaf is moved along by the top pushers presently described, by two bars 204 having outwardly turned ends 208 (Figs. 3 and 4) where the loaves enter between them.

The top carrier which takes each wrapped loaf, after it arrives above the plate as described, comprises chains 209 indicated by dotted lines in Figures 1, 3 and 4, mounted at one end upon sprockets 210 secured to shaft 63 and at the other end upon sprockets 211 secured to a shaft 212. Connecting the two chains 210 at intervals are transverse bars or plates comprising pushers 214, each of which is adapted to transfer a wrapped loaf over the plate 202 and over the sealing table presently described. The plate 202, besides serving the purpose already described, bridges over the space existing, as shown in Fig. 4, between the vertical chute and sealing table, under all adjustments of the wall 118. And it provides a smooth surface for the wrapped loaf to slide over.

An especial advantage of this machine is that the wrapped loaf is at no time relieved from equal pressure sufficiently distributed over it to hold the wrapper smoothly when it is leaving the top of the vertical chute and moving toward and to the sealing mechanism. Owing to the fact that the elevating mechanism comprises a plurality of fingers 52 in a group instead of a single plate, I am able to distribute the support for each loaf over a considerable lateral area to properly press against the bottom of the loaf, and yet without providing any large opening for the retreat of said fingers.

In order that the loaves shall be caused to be pressed downwardly on the sealing table and on the wiping apron 241 presently described, we provide weights in the form of plates 216 pivotally connected to arms 215 which are hung at 217 from brackets adjustably mounted on frame rods 218.

Each weight 216 is substantially horizontal and the arm or link 215 is inclined (see Fig. 4) so that when the weight is lifted by a loaf that is being pushed along the table 219 said weight moves up in the arc of a circle, thereby avoiding the frictional resistance to being lifted that would result from guides directing it perpendicular. In other words, the plate swings instead of being pushed straight up.

Figure 32:
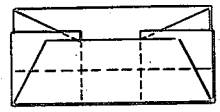

The pushers 214 slide the loaves over the upper surface 219 of the sealing table which is hollow (Fig. 4) and kept heated by suitable means such as steam connections with the space below the surface 219. In a depression or pocket 220 in the sealing table are mounted two idle rolls 221 (Figs. 21, 22 and 25). A pipe 229 for a supply of suitable material, such as melted wax known as paraffin, leads into the pocket 220 to supply said rolls with wax and apply it to the under surface of the wrapped loaf, which under surface carries the overlying flaps of paper as indicated in Figure 32, so as to seal said flaps as soon as the article cools, as presently described.

Suitably mounted below the sealing table is a receptacle or tank 223 (Figures 1, 4, 21 and 23,) said tank having a horizontal heating chamber 224. A supply of paraffin can be deposited in the tank in any suitable manner. To supply the sealer in the pocket 220 from said tank, we employ suitable pump mechanism, such as illustrated in Figures 21, 23 and 24. Within a lateral extension of the tank 223 is a casing 226 containing intermeshing toothed members 227. Admission to the space is provided by a port 228. Opposite said port is a pipe 229 which leads to pocket 220. One of the toothed members 227 is mounted to rotate with a vertical shaft 230 having a pulley 231 driven by a belt 232 from a pulley 233 on a shaft 234 supported by ears 235 suitably mounted as indicated in Figure 4. Any surplus supply of melted paraffin, due to more than sufficient operation of the pump or due to the fact that no wrapped loaves are traveling over the applier 221, is taken care of by overflowing into gutters 236 (Figs. 21 and 23) from which it flows through suitable apertures into lower gutters 238. The gutters 238 have suitable connections, not necessary to illustrate, for delivering surplus wax back into the tank 233.

It will be understood, of course, that the last folding operation resulting from the transfer of the loaf toward the sealing table results in the bottommost flap extending rearwardly under the loaf, and consequently this flap is ironed out as it is pushed along over the upper surface of the sealing table. As has been mentioned, the sealing table is kept hot. In practice, it is kept at such a temperature that the melted paraffin, or other suitable sealing material, will not only be thoroughly distributed by means of the appliers 221 in pocket 220 but will cause sufficient saturation of the undermost flaps to cause the overlapping flaps to adhere firmly. The tops of the rolls 221 are slightly above the plane of the passage of the bottom of the wrapped loaf so that the pressure, as the loaf passes over the pocket 220, will aid in effecting saturation. As shown in Figures 3 and 21, the upper surface of the sealing table or a portion thereof is formed with laterally inclined grooves 240. These grooves act upon the bottom flap to work aside surplus paraffin and also smooth out the bottom flap from the middle toward the ends so as to aid in imparting a smooth finish to the sealed bottom of the loaf. To aid in preserving the smooth condition of the bottom folds of the wrapped loaf after it leaves the sealing table, we employ a belt 241 the upper surface of which is constantly traveling rearwardly or in a direction opposite to the direction of movement of the loaves, said belt being open to the atmosphere and of sufficient length to permit sufficient cooling of the paraffin wax while the wrapped loaf is being pushed along by the pushers 214 over said belt 241. Said belt is mounted upon rolls one of which is carried by shaft 234 and the other by a shaft 242 (Fig. 4). The shaft 242 is driven by suitable chain gearing from the shaft 212 as indicated by dotted lines in Figure 4, the belt 241 acting upon the roll of shaft 234 so as to cause pulley 233 (Fig. 1) to actuate the pump through belt 232. The belt 241 is made of suitable material, such as canvas, which will to some extent act as an absorbent so that when the wrapped loaf leaves the heated sealing table and is pushed on to and over the reversely traveling belt 241, the surplus melted wax will be immediately wiped off by said belt.

To remove any caked material which may be accumulated on the belt, a suitable scraper may be provided to act upon the under surface of the belt to remove said material and permit it to drop into a tank 237 (Fig. 1). The direction of motion of the belt 241 is indicated by arrows in Figures 1, 4 and 21.

The pushers 214 deliver the wrapped loaves onto a belt 244 which travels in the direction of the arrow in Figure 4, said belt being mounted on rolls 245, 246 and delivering the loaves onto the final delivery carrier belt 247 one end of which is mounted on a roll 248. Shaft 242 is driven by suitable means such as a chain 243, indicated by dotted lines in Figure 4, connecting sprockets carried by shafts 212, 242. Gears 249, 250, (Fig. 1) are of such sizes relatively to each other and to the gearing with shaft 212 that the belt 244 is driven considerably faster than the speed of the pushers 214, so that the instant that a wrapped loaf is delivered by a pusher 214 onto belt 244, the latter takes the loaf away before the direction of motion of that pusher in an upward direction around shaft 212 can "kick" the loaf over. Without such provision of the faster moving belt 244, the pusher would be liable to "kick" or roll the loaf over on its side. Said belt 244 therefore serves to ensure uniform delivery of the loaves onto the carrier 247 with their flat bottoms supported thereon. In order that this last belt may move so that the loaves placed thereon will be in close array, to facilitate their removal by an attendant for packing, the shafts of the rolls 246, 248 are connected by speed-reducing gears such as indicated by dotted lines in Figure 4. This gearing is, in fact, so proportioned that the belt 247 carries the wrapped loaves away almost in contact with each other, and the said belt 247 is, in practice, of such length as to permit an attendant to leave it, while wrapped loaves accumulate thereon, for a sufficient length of time to enable him to deposit a supply of un-wrapped loaves on the loading gravity slide-way 42, 43. It is therefore quite feasible for one person to attend to both supplying and removing the loaves.

A bridge 262 rising from a support 263 (Figure 4ª) between any two of the belts prevents the loaves from "toppling over" as they pass from one to the other.

When the advancing edge of the web of paper is being advanced over the paper bed 88 by the feed rolls, the motion is so rapid that it is desirable to render it certain that the paper shall be held flat upon said bed. To this end we may provide a series of fingers 264 (Figs. 5 and 20) which bear lightly upon the paper but are free to yield if any wrinkle or thick spot in the paper should come in contact with them. They are loosely pivoted to a transverse rod 265 near the slot for the knife, said rod being suitably supported at its ends so that it may be vertically adjusted if different thicknesses of paper are being used. Of course, these fingers 264 terminate short of the path of movement of the knife.

We will now describe the modification illustrated in Figs. 11 and 12. If the loaves to be wrapped are of a character which present variations in width rather than in height, it is desirable that the feeler shall operate laterally instead of vertically. To meet this situation, we provide a feeler consisting of a plate 270 yieldingly connected to the wall plate 46 as at 271 and limited as to its movement toward the left in Fig. 11 by an ear 272 overlapping a stop 273. In place of the lever member 94 of Figs. 7 and 8, we employ a lever member 274 having a weighted outer end 275. Pivoted at 276 to the wall plate 46 is a lever 277 having one arm provided with a roll 278 engaging the under surface of lever member 274 and having its other arm extending through a slot in wall plate 46 and provided with a roll 279 bearing against the feeler 270. The weight 275 acts through lever 277 to hold the parts normally approximately in the positions shown in Figs. 11 and 12. When a loaf passes by feeler 270, said feeler acts through lever 277 to raise lever member 274 more or less according to the width of the loaf. As the other parts of this mechanism would remain the same as those shown in Figures 7 and 8 to the right of pivot pin 95, the results will be the same as hereinbefore described in connection with said Figures 7 and 8.

As the machine operates rapidly, it is desirable that each loaf introduced by a pusher 48 (Figs. 1, 2 and 3) shall not rebound from stop plate 81 (Figs. 4 and 5) so that said loaf will stop in proper position to be carried up through the vertical chute and properly wrapped. To check the loaf from such rebound, we provide a spring plate 280 (Figs. 5, 13 and 14) said plate being secured at one end to the wall plate 46, as by rivets 281, and extending through a slot 282 in the wall plate, and having an arm 283 passing through another slot 284 in the wall plate, the end of said arm being bent as at 285 to engage the outer or rear surface of said wall plate to limit movement of the spring plate or friction check 280 in a direction away from the wall plate. The check yields to permit a loaf to be positioned against stop plate 81, but holds the loaf against wall 44 with sufficient pressure to prevent it from rebounding.

As a further and more positive means for preventing rebound of a loaf, and to determine the proper position for each loaf in the space or chamber at the lower end of the folding chute, we sometimes employ an up-right stop 286 (Figures 8 and 14) at the rear end of the feeler or shoe 93. When a loaf is carried under the member 93 by a pusher 48, it lifts said member which then drops back behind the loaf as soon as the latter clears the rear end of said member 93, and said stop then presents a barrier to any return movement of the loaf no matter how forcibly the latter is moved against plate 81 by a pusher 48. In other words, we provide a space or chamber between two stop plates (81 and 286) into which space the loaves are successively pushed to be taken by the lifters 52, one of said stop plates (286) being automatically shifted out of the way of a loaf approaching said space or chamber.

Preferably the stop 286 is adjustably connected to the shoe or finger 93, as by means of screws 287 passing through slots in the foot portion of said stop, to enable said stop to be set in the best operative position.

Having now described our invention, we claim:

1. A wrapping machine having a chute provided with folders to act on the wrappers, a series of flexibly connected shafts having fingers for engaging and elevating the articles to be wrapped, each shaft having an arm and a toe, a continuous cam track to be engaged by said arm, said track having an offset portion, and a stationary stop below said offset and out of alinement with the cam track and in the path of said toe to direct said arm into said offset to cause the rods and their fingers to swing.

2. A wrapping machine having a chute provided with folders to act on the wrappers, a series of flexibly connected shafts having fingers for engaging and elevating the article to be wrapped, each shaft having an arm and a toe, a cam track to be engaged by said arm, said track having an offset portion, a stop in the path of said toe to direct said arm into said offset to cause the rods and their fingers to swing, and means at another point of the cam track to positively return the shafts and their fingers to normal position.

3. A wrapping machine having mechanism for automatically determining the size of each wrapper by the size of the article to be enclosed in that wrapper, said mechanism including a drum and a roll movable toward and from the drum to intermittently feed a web of paper, a cutter, a cam rib carried by the drum, a lever having one end provided with a feeler parallel with the path of movement of the articles to be wrapped and having an adjustable connection with said lever whereby it may be longitudinally inclined more or less, the other end of the lever being adapted to be acted upon by said cam rib, and means for varying the time of contact between the feed drum and roll, according to the oscillatory position of said lever.

4. A wrapping machine having mechanism for automatically determining the size of each wrapper by the size of the article to be enclosed in that wrapper, said mechanism including a drum and a roll movable toward and from the drum to intermittently feed a web of paper, a cutter, a cam rib carried by the drum, a jointed lever having one end provided with a laterally rocking and longitudinally adjustable feeler in the path of movement of the articles to be wrapped and having its other end adapted to be acted upon by said cam rib, and means for varying the time of contact between the feed drum and roll, according to the oscillatory position of said lever.

5. A wrapping machine having mechanism for automatically determining the size of each wrapper by the size of the article to be enclosed in that wrapper, said mechanism including a drum and a roll movable toward and from the drum to intermittently feed a web of paper, a cutter, a cam rib carried by the drum, a jointed lever mounted on a stationary pivot and having its outer end in the path of movement of the articles to be wrapped and having its inner end laterally movable and in the path of movement of said cam rib, a movable support to hold the roll spaced from the drum, means whereby actuation of the inner end of the lever laterally by the cam rib will remove said support to let the roll drop, and means whereby further rotation of the drum will restore said support to position to separate the roll from the drum.

6. A wrapping machine having mechanism for automatically determining the size of each wrapper by the size of the article to be enclosed in that wrapper, said mechanism including a drum and a roll movable toward and from the drum to intermittently feed a web of paper, a cutter, a cam rib carried by the drum, a jointed lever mounted on a stationary pivot and having its outer end in the path of movement of the articles to be wrapped and having its inner end laterally movable and in the path of movement of said cam rib, a movable support to hold the roll spaced from the drum, means whereby actuation of the inner end of the lever laterally by the cam rib will remove said support to let the roll drop, and means whereby further rotation of the drum will restore said support to position to separate the roll from the drum, said means comprising a rotatably adjustable cam carried by the drum and a lever actuated by said cam and connected to said support to restore it to operative position.

7. A wrapping machine having a vertical passageway or chute, carriers for elevating articles through said chute, and folders for acting on wrappers draped over said articles, said folders including a pair of pivoted arms mounted to gravitate toward each other and having flexible upright portions means being provided to positively limit the rocking movements of the arms in either direction.

8. A wrapping machine having a vertical passageway or chute, a pair of rods extending inward from opposite sides of the chute, arms pivotally supported by the inner ends of the rods and free to gravitate toward each other and having hooked portions extending over the rods to limit swinging movements of the arms, flexible upright folders carried by said arms, and means for elevating articles with overdraped wrapper sheets through said chute.

9. A wrapping machine having a chute or passageway, means for elevating articles through said chute, folders for enclosing the articles in wrappers while in transit through said chute, a side flap tucker at the upper end of said chute, a rod carrying said tucker, a rock shaft having depending arms carrying said rod, said rock shaft having a third arm, and a cam engaging said third arm to actuate said rock shaft and impart a swinging movement to said tucker with its front edge acting on the wrapper flap.

10. A wrapping machine having a vertical passageway or chute, carriers and folders for enclosing articles in wrappers during transit through said chute, a swinging extension rising above the top of the chute, and movable relatively to the path of articles through the chute to act as a detent to prevent recession of articles, a plate extending substantially horizontally from said extension, and means for transferring the enclosed articles over said plate.

11. A wrapping machine having a vertical passageway or chute, carriers and folders for enclosing articles in wrappers during transit through said chute, a sealing table, carriers for transferring the enclosed articles over said table, a swinging extension rising above the top of the chute for preventing return movement of the articles into the chute, and a plate pivoted to said extension and extending toward said table.

12. A wrapping machine having a vertical passageway or chute, folders for operating on a wrapper on an article in said chute, lifters for raising the articles and wrappers through the chute, means being provided for dropping the lifters when they reach the upper end of the chute, a transferring carrier movable across the upper end of the chute, a swinging bar rising above the top of the chute for preventing return of each article when its lifter leaves, and a plate pivoted to said bar and extending toward said table.

13. A machine having folders for enclosing articles in wrappers, a sealing table, an endless carrier having pushers for moving the wrapped articles over said table, a plurality of elongated weights in alinement to bear on the articles to increase the bearing of the articles on said table, and a single longitudinally adjustable swinging arms pivotally connected to each of said weights intermediate its ends whereby each weight can rock endwise.

14. A wrapping machine having mechanism for automatically determining the size of each wrapper by the size of the article to be enclosed in that wrapper, said mechanism including a lever and connections whereby the position of the lever determines the size of the wrapper, a portion of said lever being interchangeable to be acted upon by the top or by one side of the article to be wrapped.

15. A wrapping machine comprising a table, means for intermittently feeding a strip over the table, a knife movable toward and from the table to sever the strip, pressers at opposite sides of and movable with the knife, an auxiliary presser located to bear on the mid-width portion of the strip to hold the strip when the knife is raised, means for manually raising said auxiliary presser and means for wrapping articles in sections cut from the strip.

16. A wrapping machine comprising means for intermittently gripping and feeding a strip, a cutter for severing the strip, a gravity device to hold the strip in loop form on its way to the feeding and severing mechanism, a presser in position to act on substantially the mid-width of the strip, said presser being intermediate the cutter and the feeding mechanism, means for operating said presser alternately with the operation of the gripping and feeding mechanism to hold the strip centrally to permit the gravity device to straighten the strip, and means for wrapping articles in sections cut from the strip.

17. A wrapping machine comprising a table, means for intermittently feeding a strip over the table, a knife movable toward and from the table to sever the strip, pressers movable with the knife, an auxiliary presser to hold the strip when the knife is raised, means for automatically operating said auxiliary presser, means for wrapping articles in sections cut from the strip, and means for manually lifting the auxiliary presser.

18. A wrapping machine having a chamber to receive articles to be wrapped, means for supplying articles singly to said chamber, means for removing said articles from said chamber and enclosing them in wrappers, a movable member in position to be actuated by the articles on their way to said chamber, means carried by said movable member to aid in positioning each article in said chamber, and means controlled by said movable member for determining the sizes of the wrappers to accord with the sizes of the articles.

19. A wrapping machine having means for supplying a wrapper for each article to be inclosed thereby, folding instrumentalities for inclosing each article in a wrapper, and means for automatically determining the size of the wrapper for each article in accordance with the size of that article, said means including a movable member in position to be actuated by articles on their way to be wrapped, said movable member having a stop to prevent rebound of an article after passing said member.

20. A bread wrapping machine having a vertical chute, an endless series of loaf lifters upwardly movable through said chute, means for supplying wrapper sections across the chute above each loaf in position to cause edge portions of the wrapper to depend below the loaf as the latter is lifted, a series of horizontally movable pushers for effecting removal of the loaves from the upper end of the chute, a tucker movable in the direction of travel of the pushers to turn one of the depending flaps of each wrapper under the loaf, means for interrupting the elevating movement of each lifter when the loaf reaches the upper end of the chute, movable end pressers to hold each loaf in position for the tucker to act after the lifter ceases to support the loaf, and means for actuating said end pressers to and from loaf-holding positions.

21. In a bread wrapping machine, a series of pivotally supported and endlessly movable loaf lifters, a chute through which the lifters pass, means for assembling a wrapper with each loaf while being lifted, means for maintaining the lifters in proper position for supporting the loaves being lifted, movable pressers between which the loaves are delivered by the lifters, and means for actuating said pressers to and from loaf-pressing positions.

22. In a bread wrapping machine, a series of pivotally supported and endlessly movable loaf lifters, a chute through which the lifters pass, means for assembling a wrapper with each loaf while being lifted, means for maintaining the lifters in proper position for supporting the loaves being lifted, movable pressers between which the loaves are delivered by the lifters, means for actuating said pressers to and from loaf-pressing positions, supports movable to and from position to engage front and rear lower corners of each loaf arriving at the top of the chute, and horizontally movable pushers for removing the loaves from said supports.

23. In a bread wrapping machine, a series of pivotally supported and endlessly movable loaf lifters, a chute through which the lifters pass, means for assembling a wrapper with each loaf while being lifted, means for maintaining the lifters in proper position for supporting the loaves being lifted, horizontally movable pushers for removing the loaves from the top of the chute, and a pivoted flat-faced support over which the loaves are moved by the pushers, said support being movable from one position to another to first let each loaf pass it when reaching the top of the chute and then partly under the bottom of the loaf.

24. A machine having folders for enclosing articles in wrappers, a sealing table, an endless series of pushers for moving the wrapped articles over said table, an elongated substantially horizontal weight above the table, and means for permitting the weight to swing upwardly and longitudinally in the arc of a circle when lifted by an article passing under it.

25. A machine having folders for enclosing articles in wrappers, a sealing table, an endless series of pushers for moving the wrapped articles over said table, an elongated substantially horizontal weight above the table, and inclined link connections for permitting the weight to swing upwardly and longitudinally when lifted by an article passing under it.

In testimony whereof we have affixed our signatures.

HENRI A. SÉVIGNÉ.
FRANK K. ARNOLD.